United States Patent [19]

Yuki et al.

[11] Patent Number: 4,554,323
[45] Date of Patent: Nov. 19, 1985

[54] POLYMERIZABLE, OPTICALLY ACTIVE POLYMER AND PROCESS FOR PREPARING POLYMERIZABLE POLYMER

[75] Inventors: Heimei Yuki, Sakai; Yoshio Okamoto, Amagasaki, both of Japan

[73] Assignee: Daicel Chemical Industries, Ltd., Osaka, Japan

[21] Appl. No.: 493,173

[22] Filed: May 10, 1983

[30] Foreign Application Priority Data

May 21, 1982 [JP] Japan .................................. 57-86206

[51] Int. Cl.[4] ............................. C08F 2/06; C08F 8/00
[52] U.S. Cl. .................................... 525/272; 525/267; 525/271; 525/910; 525/911
[58] Field of Search ................ 526/180; 525/910, 329, 525/359, 272, 267

[56] References Cited

U.S. PATENT DOCUMENTS

| | | | |
|---|---|---|---|
| 3,786,116 | 1/1974 | Milkovich et al. ................. | 260/885 |
| 3,890,278 | 6/1975 | Lehn et al. ....................... | 526/180 X |
| 3,911,054 | 10/1975 | Roest et al. ...................... | 526/180 X |
| 4,116,887 | 7/1978 | Lehn et al. ....................... | 526/180 X |
| 4,243,787 | 1/1981 | Boileau et al. ..................... | 526/180 |
| 4,254,247 | 3/1981 | Boileau et al. ..................... | 526/180 |

OTHER PUBLICATIONS

Chem. Abstracts—vol. 91, 1979, 57612j—"Alternating Copolymerization . . . ", Yuki et al I—Polym. J.
Chem. Abstracts—vol. 94, 1981, 140270d—"Copolymerization . . . THF",Yuki et al II—Polym. Prepr., Am. Chem. Soc. Div. Polym. Chem. 1979.

*Primary Examiner*—Carman J. Seccuro
*Attorney, Agent, or Firm*—Flynn, Thiel, Boutell & Tanis

[57] ABSTRACT

A polymerizable polymer is obtained by the anionic polymerization and termination by use of a vinyl monomer. It produces a graft copolymer by co-polymerization with another monomer. The process produces a new, polymerizable, optically active polymer and a graft copolymer thereof.

5 Claims, No Drawings

POLYMERIZABLE, OPTICALLY ACTIVE POLYMER AND PROCESS FOR PREPARING POLYMERIZABLE POLYMER

The present invention relates to a process for producing polymerizable polymers.

As is well known, graft and block copolymers have a microscopically heterogeneous structure, while other polymers have a homogeneous phase. The graft copolymers are useful as copolymers having a high flexibility which accomodates various uses and broad functions realized by the variety of the combinations, possibility of formation of higher molecular structures and their intrinsic mechanical properties.

Generally, graft copolymers are produced by any of the following three processes:

(1) a process wherein an active center for initiating the polymerization is formed in a main chain of a trunk polymer and then a branch-forming monomer is polymerized therewith.

(2) a process wherein a branch prepolymer previously formed is coupled with a trunk polymer by a suitable method, and (3) a process wherein a previously prepared, polymerizable polymer is polymerized with a polymerizable monomer.

In the conventional process (1), homopolymerization occurs frequently in the polymerization of the branch polymer and, therefore, isolation of the graft copolymer from the polymerization product is required in many cases. Further, it is relatively difficult to control the homogeneity of the graft copolymer, the number of branches and molecular weight distribution. In process (1), the degree of freedom in the molecular design is low. Process (2) has a merit that a graft copolymer having a desired structure can be prepared easily. However, it is difficult to carry out the reaction wherein one polymer is reacted with another polymer. Process (3) is an improvement on process (2), whereby a graft copolymer is obtained by the copolymerization of a polymerizable polymer with a monomer.

Recently, numerous studies are made on process (3), since this process is highly useful. According to the specifications of, for example, Japanese Patent Publications Nos. 45358/78, 10996/79, 21871/79 and 44716/79, this process comprises generally the steps of:

(a) preparing a branch polymer from a monomer a by living polymerization using a lithium initiator:

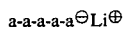

(b) terminating the polymerization with a halogen-containing monomer b to obtain a polymerizable polymer:

a-a-a-a-a-b and (c) polymerizing the polymerizable polymer obtained above with an ordinary monomer c:

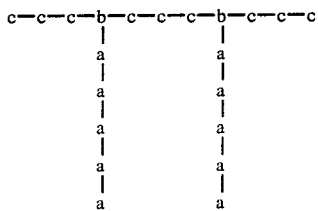

However, this process of obtaining the graft copolymer via the polymerizable polymer according to steps (a) to (c) has the following disadvantages. Although the polymerizable polymer is obtained by terminating the polymerization with the halogen-containing monomer, the polymerization reaction is terminated also by impurities such as water contained in the reaction system or another factor, whereby the yield of the intended polymerizable polymer is reduced. Further, the polymerization is not terminated by the reaction with the halogen group of the halogen-containing monomer but addition reaction of the vinyl group occurs in some cases. In such a case, a so-called "capping step" (see, for example, Japanese Patent Publication No. 21871/1979) is required. In addition, when some monomers, particularly those having a high polarity, are used, it is difficult to carry out even the living polymerization per se.

After intensive investigations made for the purpose of overcoming these disadvantages, the inventors have found a novel process for producing polymerizable polymers. The present invention has been attained on the basis of this finding.

The present invention provides a process for producing polymerizable polymers characterized by polymerizing at least one anionically polymerizable monomer in the presence of an anionic polymerization initiator obtained from an amine containing one or more primary amino groups or two or more secondary amino groups and then reacting a terminal amino group of the resulting polymer with a reactive vinyl compound.

The process for producing the polymerizable polymers and graft copolymers therefrom according to the present invention generally comprises the steps of:

(1) preparing a branch polymer from a monomer a in the presence of an anionic polymerization initiator I containing an amino group:

I-a-a-a-a-a (2) reacting the resulting polymer with a reactive vinyl compound b to obtain a polymerizable polymer:

b-I-a-a-a-a-a and (3) polymerizing the polymerizable polymer obtained above with an ordinary monomer c to obtain a graft copolymer:

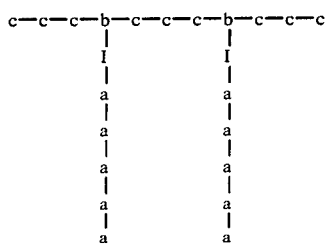

The process of the present invention for producing the polymerizable polymer is characterized in that the reactive monomer is introduced into a terminal of the initiator, while the reactive monomer is introduced into a terminal of the polymer where the polymerization is terminated in conventional processes.

In the process of the present invention, the polymerization reaction may be terminated with any terminator. The process is free of the defect that the reaction with the vinyl group of a reactive vinyl monomer occurs when the reactive vinyl monomer is introduced. The process is thus far more excellent than conventional processes.

The anionically polymerizable monomer used in the present invention may be any of monomers which can undergo anionic polymerization. They include, for example, the following compounds:

N,N-disubstituted acrylamides: e.g. N,N-dimethylacrylamide and N,N-diphenylacrylamide, acrylic and α-substituted acrylic esters: e.g. methyl methacrylate, methyl acrylate, methyl α-phenylacrylate, benzyl acrylate and diphenylmethyl methacrylate, styrene and derivatives thereof: e.g. styrene, α-methylstyrene and p-methoxystyrene and other anionically polymerizable monomers: e.g. vinylpyridine, acenaphthylene, 9-acrylcarbazole, isoprene and butadiene.

Particularly, for obtaining optically active, polymerizable polymers, the polymeric chain may contain an optically active monomer as a constituting unit or it may have a molecular asymmetry.

As the optically active monomers, there may be mentioned α-substituted acrylic esters and N,N-disubstituted acrylamides derived from optically active alcohols and amines. Particularly, they include anionically polymerizable monomers such as α-methylbenzyl methacrylate, menthyl acrylate, N-methyl-N-1-phenylethylacrylamide and N-methyl-N-1-cyclohexylethylacrylamide.

The polymeric chains having a molecular asymmetry are, for example, those having a unidirectional spiral structure. They are polymers comprising anionically polymerizable monomers of the following general formulae:

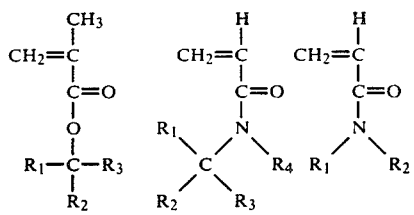

wherein $R_1$, $R_2$ and $R_3$ may be the same or different and each represent

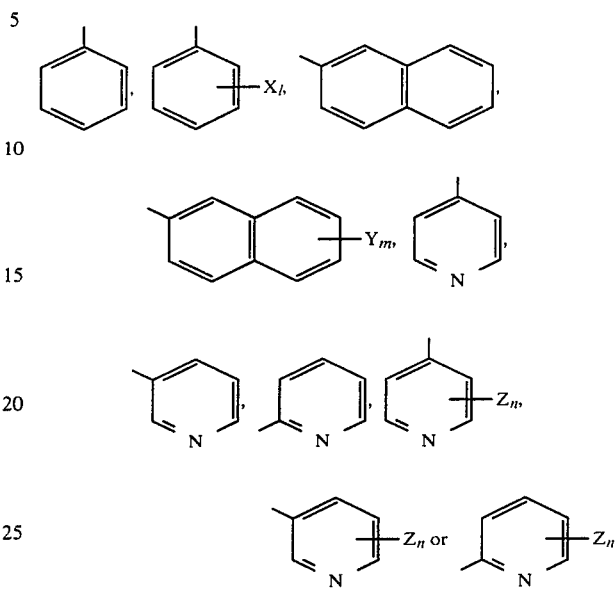

in which X, Y and Z represent each an alkyl group, a halogen or an amino group, l, m and n represent each the number of the substituents and are each an integer of 1 to 5, and $R_4$ is an alkyl having 1 to 4 carbon atoms.

As the monomers, there may be mentioned, for example, triphenylmethyl methacrylate, diphenyl(α-naphthyl)methyl methacrylate, diphenyl(β-naphthyl)methyl methacrylate, diphenyl(4-pyridyl)methyl methacrylate, phenyldi(4-pyridyl)methyl methacrylate, tri(4-pyridyl)methyl methacrylate, tri(4-fluorophenyl)methyl methacrylate, N-methyl-N-triphenylmethylacrylamide, N,N-diphenylacrylamide, N-phenyl-N-α-naphthylacrylamide and N-phenyl-N-β-naphthylacrylamide.

The anionic polymerization initiators are those containing an alkali metal such as lithium, potassium and sodium, an alkaline earth metal such as magnesium and calcium, aluminium or an analogous metal, characterized by being obtained from an amine containing one or more primary amino groups or two or more secondary amino groups. Examples of the amines are primary amines of the general formula $R^1NH_2$ and secondary amines of the formula

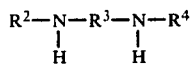

in which $R^1$, $R^2$ and $R^4$ represent each an alkyl or alkenyl group having 1 to 20 carbon atoms or an aryl group (such as phenyl or naphthyl) and $R^3$ represents an alkylene group having 1 to 20 carbon atoms or an arylene group (such as phenylene or naphthylene).

More particularly, the amines include the following compounds:

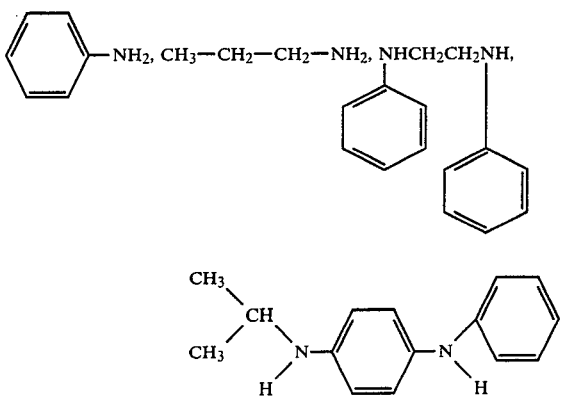

The anionic polymerization initiators may be obtained easily by reacting these amines ($R^1NH_2$ or $R^2NH-R^3-NHR^4$) with, for example, alkyllithiums ($R^5Li$) according to the following scheme:

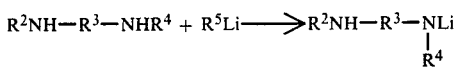

wherein $R^5$ represents an alkyl group having 1 to 15 carbon atoms.

Particularly, optically active initiators used for the polymerization of the optically active polymerizable polymers may be obtained by combining the anionic initiators containing alkali metal, alkaline earth metal, aluminum or an analogous metal, obtained from amines containing one or more primary amino groups or two or more secondary amino groups, with the following asymmetric ligand compounds:

(1) (+)-or (−)-sparteine and derivatives thereof such as (−)-sparteine, (−)-6-ethylsparteine, (+)-6-benzylsparteine and (−)-dihydrosparteine, and (2) asymmetric ligand compounds of the following general formulae (I) or (II):

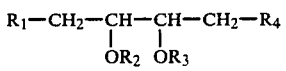

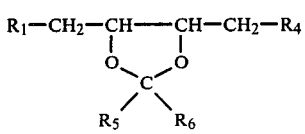

wherein $R_1$ and $R_4$ represent each $-O-R_7$, $-S-R_7$,

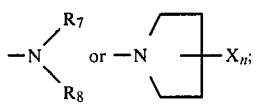

$R_2$, $R_3$, $R_5$, $R_6$, $R_7$ and $R_8$ represent each an alkyl group having 1 to 10 carbon atoms; X represents hydrogen, an alkyl group having 1 to 10 carbon atoms or a halogen; and n represents a number of 1 to 4.

As examples of the asymmetric ligand compounds, the following compounds may be mentioned in which a symbol * represents the asymmetric carbon atom:

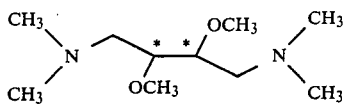

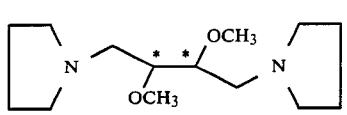

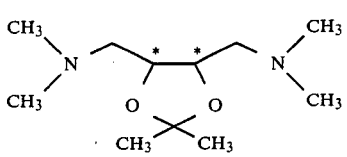

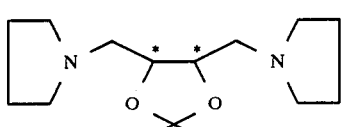

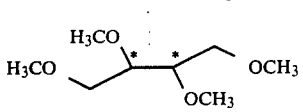

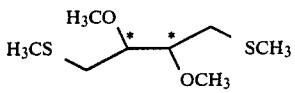

The amount of the above-mentioned initiator used in the production of the polymerizable polymers according to the present invention is variable depending on the molecular weight of the intended polymerizable polymer. The smaller the amount of the initiator, the higher the molecular weight of the obtained polymer.

The anionic polymerization may be carried out by using the anionically polymerizable monomer alone. However, if a suitable solvent is used, the heat transfer and the mixing of the anionic polymerization initiator with the anionically polymerizable monomer are facilitated. As the solvents, those which do not inhibit the anionic polymerization may be used. They include, for example, hydrocarbons and ethers. Particular examples of them are benzene, toluene, diethyl ether, dioxane, tetrahydrofuran, n-hexane, cyclohexane and n-heptane.

The anionic polymerization may be carried out by a known, conventional process. The polymerization temperature is selected in the range of from −100° C. to about 100° C., preferably from −78° C. to 60° C.

The polymerizable polymer of the present invention may be obtained by reacting a reactive vinyl compound with an initiating terminal amino group of a polymer obtained by the anionic polymerization. As the reactive vinyl compound there may be used any of those reactive with an amino group. More particularly, they include compounds of the following general formulae:

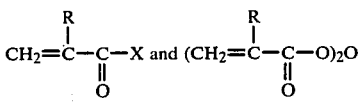

wherein R represents H or a hydrocarbon having 1 to 10 carbon atoms and X represents a halogen atom.

Preferred compounds are acrylyl chloride, methacrylyl chloride, acrylic anhydride and methacrylic anhydride.

The formation of the polymerizable polymer is accelerated by using a tertiary amine such as triethylamine in an equimolar amount to the reactive vinyl compound or in a slightly excess in an inert organic solvent such as ether or toluene.

The polymerizable polymer of the present invention has a number-average molecular weight $\overline{Mn}$ of preferably 50/Mn/1 000 000, more preferably 1 500/Mn/1 000 000.

To obtain a graft copolymer from the polymerizable polymer of the present invention, the polymerizable polymer obtained by the above process is copolymerized with a polymerizable monomer. The copolymerization may be carried out by any of the radical polymerization, anionic polymerization and cationic polymerization processes.

As the polymerizable monomers, those having a polymerizable vinyl group may be used. More particularly, they include the following compounds:

halogenated monoolefins: e.g. vinyl chloride, vinylidene chloride, vinylidene fluoride and tetrafluoroethylene, styrene and derivatives thereof: e.g. styrene and α-substituted styrenes, heteroaromatic ring-containing C-vinyl compounds: e.g. vinylfuran, vinylthiophene and vinylpyridine, dienes: e.g. butadiene and alkyl-, aryl- and halogen-substituted butadienes, acrylonitrile and derivatives thereof: e.g. acrylonitrile, methacrylonitrile and vinylidene cyanide, acrylamide and derivatives thereof: e.g. acrylamide, methacrylamide, α-phenylacrylamide, α-benzylacrylamide, α-chloroacrylamide, N-monoalkyl-substituted acrylamides, N-monoaryl-substituted acrylamides, N,N-dialkyl- and diaryl-substituted acrylamides and N-monoalkyl-substituted methacrylamides, α,β-unsaturated aldehydes: e.g. acrolein, methacrolein, alkyl vinyl ketones such as methyl vinyl ketone and aromatic vinyl ketones, acrylic acid and its halide, salts, and esters and α,β-substituted derivatives thereof: e.g. α-alkyl-substituted acrylic acids and salts and halides thereof, α-alkyl-substituted acrylic esters and methylenemalonic diesters, fumaric esters, maleic esters, diolefinic acid esters and thioesters of α,β-unsaturated acids, and vinyl acetate.

The initiators used in the copolymerization reaction are radical, anionic and cationic polymerization initiators. Among them, the radical polymerization initiators are particularly preferred. They include, for example, azobisisobutyronitrile and peroxide catalysts. As examples of the preferred peroxide catalysts, there may be mentioned hydrogen peroxide, benzoyl peroxide, 1-butyl peroctoate, phthalic peroxide, succinic peroxide, benzoylacetic peroxide, coconut oil acid peroxide, lauric peroxide, stearic peroxide, maleic peroxide, t-butyl hydroperoxide, di-t-butyl peroxide and analogues thereof.

The amount of the catalyst used is determined depending on the initiator used. The catalyst is used in an amount of 0.01 to 10 wt. % based on the total monomer, preferably 0.1 to 5 wt. % in the radical polymerization.

The copolymerization reaction may be carried out at a temperature ranging from $-100°$ C. to $100°$ C. In the radical polymerization, a temperature in the range of room temperature to $90°$ C. is particularly preferred. It is preferred in the copolymerization reaction to use the polymerizable monomer and a solvent in which it is soluble.

According to the present invention, an optically active graft copolymer having an optically active polymer as a side chain is provided.

The graft copolymer containing the optically active polymer as a branch polymer has excellent properties such as physical properties, e.g., film-forming properties and amphipathic properties, which an optically active homopolymer can not exhibit.

The optically active graft copolymer of the present invention may be obtained by various processes. As typical examples of these processes, the following three processes may be mentioned and any of them may be employed:

(a) a process wherein an active center for initiating the polymerization is formed in a main chain of a trunk polymer and then a branch-forming monomer is polymerized therewith to form an optically active graft copolymer, (b) a process wherein an optically active branch prepolymer is coupled with a trunk polymer by a suitable method to obtain an optically active graft copolymer, and (c) a process wherein a previously prepared, optically active polymerizable polymer is polymerized with a polymerizable monomer to obtain an optically active graft copolymer. The resulting graft copolymer comprises the polymerizable monomer and the polymerizable polymer in which the vinyl monomer is added to a terminal of the optically active polymer, having a number-average molecular weight Mn of from more than 3,000 to less than 90,000,000, or from more than 50 to less than 1,000,000.

The optically active polymerizable polymer may be obtained according to a process which will be described below, in addition to the abovementioned process for producing the polymerizable polymer according to the present invention. The anionically polymerizable monomer is polymerized in the presence of an optically active anionic polymerization initiator such as (−)-sparteine-BuLi, (+)-6-benzylsparteine-BuLi or a combination of a lithium amide obtained from a secondary amine with an asymmetric ligand compound, e.g., a combination of lithium α-phenylethylanilide with (+)- or (−)-dimethoxy-1,4-bis(dimethylamino)butane or a combination of lithium benzylamide with (+)- or (−)-dimethoxy-1,4-bis(dimethylamino)butane to form a monofunctional polymer. Then, the resulting polymer is reacted with a halogen-containing epoxide or a halogen-containing vinyl compound such as acrylyl chloride, methacrylyl chloride or chloromethylated styrene to form a high molecular monomer having a copolymerizable terminal group. Thus, the optically active, polymerizable polymer can be obtained.

The following examples will further illustrate the present invention, which by no means limit the invention.

EXAMPLE 1

The asymmetric polymerization of triphenylmethyl methacrylate was carried out in the presence of a combination of lithium amide with (R,R)-(−)-dimethoxy- 1,4-bis(dimethylamino)butane[(R,R)-(—)-DDB] of the following formula (I):

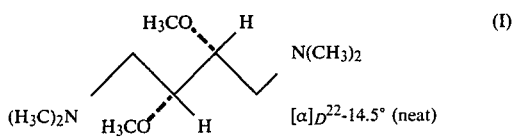

in toluene at −78° C.

The polymerization reaction was carried out in nitrogen stream in a sufficiently dried, sealed glass tube. In this process, 10.0 g (30.5 mmol) of triphenylmethyl methacrylate was dissolved in 200 ml of toluene and the resulting solution was cooled to −78° C. Then, a catalyst was prepared by reacting butyllithium (BuLi) with an equivalent amount of N,N'-diphenylethylenediamine at room temperature to form lithium amide and adding 1.2 parts of (R,R)-(—)-DDB to 1 part of the formed lithium amide. 1/20 equivalent amount, based on the monomer, of the catalyst was added to a solution of the monomer in toluene to initiate the polymerization.

The polymerization was terminated with a small amount of methanol. The resulting polymer was precipitated in 2 l of methanol. The precipitate was centrifuged, dried and weighed. The polymer was obtained quantitatively and had the specific rotatory power $[\alpha]_D^{25}$ of −307° (in THF).

The polymer was dissolved in 100 ml of THF and then precipitated in 1 l of benzene/hexane (1:1). The precipitate was centrifuged and fractionated into benzene/hexane (1:1)-soluble and -insoluble fractions.

The insoluble fraction was obtained in a yield of 92%. This product had an $[\alpha]_D^{25}$ of −326° (in THF) and a number-average molecular weight of 17600.

EXAMPLE 2

2 g of polytriphenylmethyl methacrylate obtained in Example 1 was dissolved in 20 ml of dry tetrahydrofuran (THF). 0.08 ml of acrylyl chloride and 0.28 ml of triethylamine were added to the solution. The mixture was stirred at 0° C. for 1 h and then reacted at room temperature for 24 h. The polymer was precipitated in methanol. The precipitate was centrifuged and dried. The polymer was obtained quantitatively and had a specific rotary power $[\alpha]_D^{25}$ of −325° (in THF). In the infrared absorption spectrum, a weak absorption supposedly due to the amido group was recognized at 1670 cm$^{-1}$.

EXAMPLE 3

0.2 g of the polymerizable polymer (Mn=17600) obtained in Example 2 and 0.5 g of methyl methacrylate were dissolved in 5 ml of tetrahydrofuran. 2 molar %, based on the monomer, of azobisisobutyronitrile was added to the solution and the polymerization was carried out at 60° C. for 24 h. The resulting polymer was precipitated in methanol. The precipitate was filtered out and dried to obtain the polymer in a yield of 63%.

The resulting copolymer had a number-average molecular weight (Mn) of 28300 as determined by using an ultraviolet absorption detector (254 nm) according to GPC (gel permeation chromatography).

EXAMPLE 4

0.2 g of the polymerizable polymer (Mn=17600) obtained in Example 2 and 1.0 g of methyl methacrylate were dissolved in 5 ml of tetrahydrofuran. 2 molar %, based on the monomer, of azobisisobutyronitrile was added to the solution and the polymerization was carried out at 60° C. for 24 h. The resulting polymer was precipitated in methanol. The precipitate was filtered out and dried. The yield was 72%.

The resulting copolymer had the number-average molecular weight (Mn) of 41,800 as determined by using an ultraviolet absorption detector (254 nm) according to GPC.

EXAMPLE 5

0.1 g of the polymerizable polymer (Mn=17600) obtained in Example 2 and 0.2 g of methyl methacrylate were dissolved in 5 ml of toluene. About 2 molar %, based on the monomer, of diisopropyl peroxydicarbonate was added to the solution. The polymerization reaction was carried out at 25° C. for 24 h. The resulting polymer was precipitated in methanol. The yield of the polymer was 63% after the filtration and drying.

The resulting polymer had a number-average molecular weight (Mn) of 29300 as determined by using an ultraviolet absorption detector (254 nm) according to GPC.

EXAMPLE 6

The polymerization was conducted in the same way as shown in Example 1, except that 2-pyridyldiphenylmethyl methacrylate was used instead. The polymer was obtained quantitatively. It had a specific rotatory power $[\alpha]_{365}^{25}$ of −307° in a mixture of trichloromethane and 10% of trifluoroethanol, and a number-average molecular weight of 6,400. The polymer was then fractionated into the THF-soluble and the THF-insoluble. The former weighed 85 wt. % and the latter weighed 15 wt. %. Further the polymerizable polymer was obtained in the same manner as in Example 2, using the THF-soluble, optically active polymer.

EXAMPLE 7

The graft polymerization was carried out in the same way as in Example 3, using the polymerizable polymer as obtained in Example 6. A yield of the graft copolymer was 51 wt. % and the copolymer had a number-average molecular weight of 11,200.

The embodiments of the invention in which an exclusive property or privilege is claimed are defined as follows:

1. A process for producing a polymerizable, optically active polymer, which comprises: polymerizing at least one anionically polymerizable monomer selected from the group consisting of optically active monomers capable of forming an optically active polymer having asymmetric carbon atoms, and monomers capable of being polymerized to form a polymer having molecular asymmetry effective to make said polymer optically active, in the presence of an anionic polymerization initiator obtained from an amine containing one or more primary amino groups or two or more secondary amino groups, to obtain a polymer having a terminal amino group and then reacting said terminal amino group with a reactive vinyl compound to provide a vinyl group at the terminal of the molecule of said polymerizable, optically active polymer, wherein said initiator is an optically active initiator prepared by combining an alkali metal amide, an alkaline earth metal amide or an aluminum amide with an asymmetric ligand compound selected from the group consisting of (—)-sparteine, (+)-sparteine, (−)-6-ethylsparteine, (+)-6-benzylsparteine, (−)-dihydrosparteine,

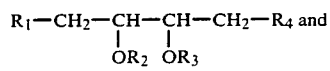

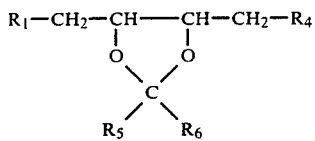

wherein $R_1$ and $R_4$ are $-O-R_7$, $-S-R_7$,

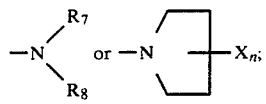

$R_2$, $R_3$, $R_5$, $R_6$, $R_7$ and $R_8$ each are alkyl having 1 to 10 carbon atoms; X is hydrogen, alkyl having 1 to 10 carbon atoms or halogen; and n is a number of from 1 to 4.

2. A process as claimed in claim 1 in which said anionically polymerizable monomer is an optically active monomer selected from the group consisting of N,N-disubstituted acrylamides derived from optically active amines and α-substituted acrylic esters derived from optically active alcohols.

3. A process as claimed in claim 1 in which said anionically polymerizable monomer is selected from the group consisting of compounds having the following formulae:

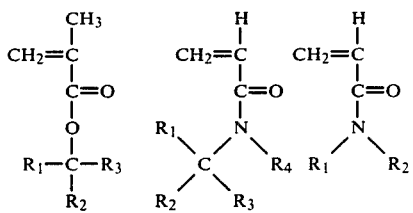

wherein $R_1$, $R_2$ and $R_3$ may be the same or different and each represent

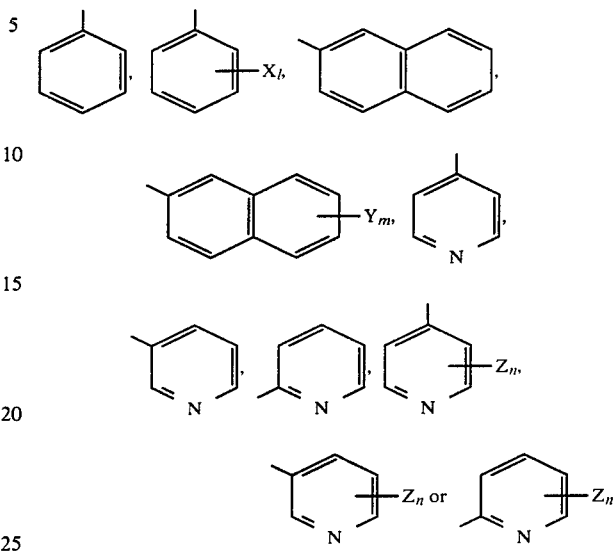

in which X, Y and Z represent each an alkyl group, a halogen or an amino group, l, m and n represent each the number of the substituents and are each an integer of 1 to 5, and $R_4$ represents an alkyl group having up to 4 carbon atoms.

4. A process as claimed in claim 1 in which said reactive vinyl compound is selected from the group consisting of

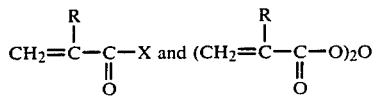

wherein R is hydrogen or a hydrocarbon having 1 to 10 carbon atoms, and X is halogen.

5. A process as claimed in claim 1 in which said reactive vinyl compound is selected from the group consisting of acrylyl chloride, methacrylyl chloride, acrylic anhydride and methacrylic anhydride.

* * * * *